United States Patent Office 3,450,743
Patented June 17, 1969

3,450,743
AMINONORBORNANE DERIVATIVES
Hiroshi Tanida, Osaka, and Teruji Tsuji, Takatsuki-shi, Japan, assignors to Shionogi & Co., Ltd., Osaka, Japan
No Drawing. Filed Dec. 17, 1965, Ser. No. 514,664
Claims priority, application Japan, Dec. 19, 1964; 39/71,837, 39/71,838; Dec. 25, 1964, 39/73,365
Int. Cl. C07c 87/64, 93/00, 87/02
U.S. Cl. 260—468                    15 Claims

ABSTRACT OF THE DISCLOSURE

The 7-aminonorbornenyl compounds of the formula

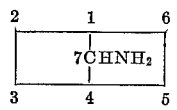

wherein a double bond or a condensed benzene ring with or without one or more substituents is present between the 5- and 6-positions are useful as anti-depressants and psychomotor stimulants.

---

The present invention relates to aminonorbornane derivatives and to the production thereof. More particularly, this invention relates to 7-aminonorbornenyl compounds useful as anti-depressants or psychomotor stimulants and to the production of these 7-aminonorbornenyl compounds.

The said 7-aminonorbornenyl compounds are represented by the formula:

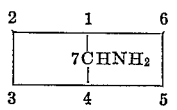 (I)

wherein a double bond or a condensed benzene ring with or without one or more substituents is present between the 5- and 6-positions.

Accordingly, it is a basic object of the present invention to embody the aforesaid 7-aminonorbornenyl compounds (I) useful as anti-depressants and psychomotor stimulants. A further object of the invention is to embody a process for preparing the said 7-aminonorbornenyl compounds (I). These and other objects will be apparent to those conversant with the art to which the present invention pertains from the subsequent description.

The present invention comprises reacting an (N-substituted or unsubstituted)aziridine compound represented by the formula:

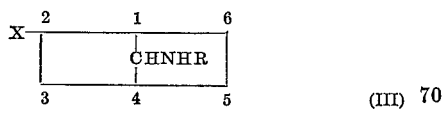 (II)

wherein R represents a hydrogen atom, a (lower) alkoxycarbonyl group, an aryloxycarbonyl group or a (lower) aralkyloxycarbonyl group, and a double bond or a condensed benzene ring with or without one or more substituents is present between the 5- and 6-positions, with hydrogen halide to give a 2-halogeno-7-(N-substituted or unsubstituted) aminonorbornene compound represented by the formula:

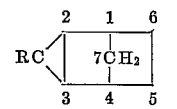 (III)

wherein X represents a halogen atom, R has the afore- said significance, and a double bond or a condensed benzene ring with or without one or more substituents is present between the 5- and 6-positions, and subjecting the 2-halogeno-7-(N-substituted or unsubstituted) aminonorbornane compound to a halogen-eliminating procedure, followed—when R is other than H—by hydrolyzing the 7-(N-substituted)aminonorbornenyl compound to give a 7-aminonorbornenyl compound of the Formula I.

Heretofore, as the synthetic method for the production of this sort of aminonorbornane compound, there has been known only a method of preparing 7-amino-norbornane barely by heating 7-benzenesulfonamido-norbornane at 150 to 170° C. for 12 hours in the presence of hydrochloric acid [Zalkow: J. Org. Chem., vol. 28, p. 3303 (1963)]. However, the physical properties of the 7-aminonorbornane were not described in the said literature. Further, this method cannot be applied to the production of 7-aminonorbornene and 7-aminobenzonorbornene, because strong conditions such as prolonged heating at 150 to 170° C. result in decomposition of the norbornenyl compounds.

According to the present invention, the 7-aminonorbornene and 7-aminobenzonorbornene derivatives can be prepared stereospecifically in good yield by the novel process hereinafter described. For instance, 7-syn- and 7-anti-isomers of the 7-aminonorbornene and 7-aminobenzonorbornene can be prepared by this invention, respectively, separation of these isomers not being required in this process.

The starting material of the present invention is a 2,3-iminobornane compound (II), and the present process can be applied to norbornane compounds, norbornene compounds ad benzonorbornane compounds. Examples of the starting material are 2,3-iminonorbornane, 2,3-imino-5-norbornene, 2,3-imino-(substituted or unsubstituted)benzo[5,6]-5-norbornene and their N-carbonates. Examples of the substituent which can be present at the N-position of the said compounds are a (lower) alkoxycarbonyl group (e.g. methoxycarbonyl, ethoxycarbonyl, propoxycarbonyl, etc.) an aryloxycarbonyl group (e.g. phenoxycarbonyl, tolyloxycarbonyl, etc.) and a (lower) aralkyloxycarbonyl (e.g. benzyloxycarbonyl, phenethyloxycarbonyl, phenylpropoxycarbonyl, etc.). As the substituent which can be present on the benzene ring, there are exemplified a lower alkyl group (e.g. methyl, ethyl, propyl, etc.), a lower alkoxy group (e.g. methoxy, ethoxy, propoxy, etc.), the amino group, a (lower)alkylamino group (e.g. methylamino, ethylamino, etc.) and di(lower) alkylamino group (e.g. dimethylamino, diethylamino, etc.). The said starting material can be prepared readily by adding an azidocarbonate to a norbornene compound to give a triazole compound and decomposing the product to give a N-substituted aziridine compound, followed, when required, by eliminating the substituent at the N-position.

The present process comprises two or three steps, that is, [A step] reacting the starting material (II) with hydrogen halide to give the halogenoaminonorbornane (III), [B step] removing the halogen atom from the halogenoaminonorbornane, and [C step], when the amino group of the halogenoaminonorbornane has a carbonate group at the N-position, eliminating the substituent at the N-position from the N-substituted aminonorbornane to give the objective 7-aminonorbornenyl compound (I).

A step

According to the present process, the starting norbornane compound (II) is treated with hydrogen halide (e.g. hydrogen chloride, hydrogen bromide or hydrogen iodide). This reaction can be effected by treating the starting material with gaseous hydrogen halide or aqueous hydrohlaic acid in the presence or absence of a solvent in a per se conventional manner. As the solvents, there are illustrated water, alcohols (e.g. methanol, ethanol or propanol), hydrocarbons (e.g. pentane, hexane, benzene or toluene), and halogenated hydrocarbons (e.g. carbon tetarachloride or chloroform). This reaction is a rearrangement reaction of the Wagner-Meerwein type and assumed to proceed stepwise through the carbonium ions. The objective substance of this step is a 2-halogeno-7-(substituted or unsubstituted) aminonorboranane compound (III).

B step

This step is effected by subjecting the 2-halogeno-7-(substituted or unsubstituted)aminonorbornane compound (III) to halogen-removing procedure such as reduction or halogen elimination. As the reduction method, there can be adopted catalytic reduction using catalyst (e.g. palladium, platinum or nickel) or a reduction method using alkali metal or alkaline earth metal in liquid ammonia. The catalytic reduction can be effected in a per se conventional manner such as shaking a mixture of the halogenoaminonorbornane and catalyst in hydrogen stream at room temperature in an inert solvent. Examples of the solvent used in the catalytic reduction are alcohols (e.g. methanol, ethanol, propanol or isopropanol), ethers (e.g. diethyl ether, tetrahydrofuran, dioxane, diglyme or tetrahydropyran) and hydrocarbons (e.g. benzene, toluene or xylene). The solvent is selected suitably from the said solvents in accordance with the qualities of the starting material and the reduction method adopted. In the catalytic reduction, there may be added favorably a basic substance for removal of the forming halogenic acid. Examples of the said acid-eliminating agents are amine compounds (e.g. trimethylamine, dimethylaniline, pyridine, picoline or collidine) and alkali salts (e.g. sodium acetate or potassium acetate). The reduction with alkali metal or alkaline earth metal in liquid ammonia can be carried out by adding the said halogenoaminonorbornane compound directly or as a solution in a suitable solvent to liquid ammonia and reacting the said components in the presence of excess alkali metal or alkaline earth metal, ordinarily at around the boiling point of liquid ammonia. As the alkali metal or alkaline earth metal, there are exemplified lithium, sodium, potassium and calcium. Further, as the solvent used in the case of adding the starting material as a solution to the liquid ammonia, there are illustrated ethers (e.g. diethyl ether, tetrahydrofuran, dioxane, diglyme or tetrahydropyran) and hydrocarbons (e.g. benzene, toluene and or xylene). Since a double bond is not reduced in the reaction of using alkali metal or alkaline earth metal in liquid ammonia, it may be adopted for preservation of a double bond in the starting material. Furthermore, the elimination may be carried out in a per se conventional manner such as heating a solution of the 2-halogenoamine compound in alcohol (e.g. methanol, ethanol or propanol) in the presence of an alkali metal (e.g. sodium, potassium or lithium). Since hydrogen halide is removed from the halogenoamine compound (III) by the elimination, there is produced an aminonorbornene compound having a newly prepared double bond. Further, ester-exchange may occur in the elimination. For instance, the reaction of 2-halogeno-7-syn-carboethoxy-aminonorbornane with sodium methoxide in methanol yields 7-syn-carbomethoxyamino-5-norbornene. Thus, there is produced the objective 7-aminonorbornenyl compound (I) or 7-substituted aminonorbornenyl compound in a good yield.

C step

When the amino group has a substituent, the 7-substituted aminonorbornenyl compound is hydrolyzed for removing the substituent at the N-position. The hydrolysis can be effected by treating the 7-substituted aminonorbornenyl compound with alkali hydroxide (e.g. sodium hydroxide or potassium hydroxide) in a per se conventional manner such as in an aqueous or alcoholic medium under heating, when required, in the presence of ethyleneglycol.

The thus-obtained 7-aminonorbornenyl compound (I) can be acylated according to the requirement of purification and manufacture of compositions. As the acylating agent, there are generally exemplified carboxylic acid anhydride (e.g. acetic anhydride, propionic anhydride or benzoyl anhydride) and carboxylic acid halide (e.g. benzoyl chloride, phenacetyl bromide or acetyl chloride). The acylation can be effected in a per se conventional manner in the presence or absence of a solvent at room temperature or under heating. As solvents, there are illustrated benzene, dioxane, chloroform and tetrahydrofuran.

Examples of the objective 7-aminonorbornenyl compound (I) are 7-syn-amino-5-norbornene, 7-anti-amino-5-norbornene and 7-anti-amino-benzo[5,6]-5-norbornene.

The objective 7-amino-norbornenyl compounds (I) are useful as anti-depressants and psychomotor stimulants. For instance, the administration of 10 milligrams of 7-anti-aminobenzo-[5,6]-norbornene hydrochloride per kilogram of body weight subcutaneous route increase spontaneous motor action moderately for 120 minutes. Further, the previous administration of 25 milligrams of the said compound per kilogram of body weight by subcutaneous route potentiates narcosis for 6 minutes and 24 seconds in anesthetized mice caused by intravenous administration of 35 milligrams of thiopental sodium per kilogram of body weight in comparison with that of the control (thiopental sodium) for 3 minutes and 40 seconds. Furthermore, the said compound protects mice from tonic extensor induced by electro-convulsive shock, when given at the effective dose ($ED_{50}$) of the 57.3 mg./kg. of body weight. The acute toxicity ($LD_{50}$) of the said compound in mice is as follows: subcutaneous 289 milligrams per kilogram of body weight.

Presently preferred and practical embodiments of the present invention are illustratively shown by the following examples wherein g.=grams(s), mg.=milligram(s), ml.=milliliter(s) and percentages are by weight.

EXAMPLE 1

(a) Into a solution of 2,3-exo-carboethoxyiminobenzo [5,6]-5-norbornene (10.0 g.) in n-pentane (120 ml.), there is introduced hydrogen bromide which is prepared by adding bromine (20.9 g.) dropwise to tetraline (80 g.). After completing the reaction in about 3 hours, the solvent is evaporated, and the residue is dissolved in ether. The ethereal solution is washed with 10% aqueous sodium carbonate, dried over anhydrous sodium sulfate and the solvent is evaporated. The residue (11.03 g.) is distilled at 130 to 133° C./0.02 to 0.01 mm. Hg to give 2-bromo-7 - anti-carboethoxyaminobenzo[5,6]-5-norbornene (8.18 g.) as crystals melting at 78 to 81° C. This substance is recrystallized from methanol to give crystals melting at 82 to 82.5° C.

I.R. cm.$^{-1}$: $\nu_{NH}$ 3400.

(b) To a solution of 2-bromo-7-anti-carboethoxy-aminobenzo[5,6]-5-norbornene (2.5 g.) and sodium acetate (660 mg.) in ethanol (150 ml.), there is added a catalyst obtained from a mixture of 1% palladium chloride (10 ml.) and active carbon (100 mg.) and the resultant mixture is subjected to catalytic reduction. In 40 minutes, hydrogen gas (198 ml.) is taken up and the catalyst is filtered off. The filtrate is concentrated and the residue (5.1 g.) is dissolved in ether. The ethereal solution is washed with 10% aqueous sodium carbonate, dried over sodium sulfate and the ether is evaporated. The residue is distilled at 124 to 126° C./0.2 mm. Hg, and the resultant crude crystals are recrystallized from hexane to give 7 - anti-carboethoxyaminobenzo[5,6]-5-norbornene (1.36 g.) as needles melting at 67 to 68° C.

I.R. cm.$^{-1}$: $\nu_{NH}$ 3430.

(c) A mixture of 7-anti-carboethoxyaminobenzo[5,6]-

5-norbornene (5.0 g.), sodium hydroxide (4.3 g.), water (10 ml.) and ethyleneglycol (30 ml.) is refluxed under heating for 3.5 hours. The reaction mixture is shaken with pentane. The pentane layer is washed with a saturated saline solution, dried over potassium carbonate and the solvent is evaporated. The residue is distilled at 87 to 92° C./1 mm. Hg under nitrogen stream to give 7-anti-aminobenzo[5,6]-5-norbornene (2.4 g.). This substance readily forms carbonate in the aerial atmosphere. The hydrochloride melts above 240° C.

NMR $t$: $H_7$ ~6.83($m$).

EXAMPLE 2

(a) To a solution of 48% hydrobromic acid (4.84 g.) in methanol (30 ml.), there is added dropwise a solution of 2,3-exo-iminobenzo[5,6]-5-norbornene (1.5 g.) in methanol (30 ml.) in 15 minutes, and the resultant mixture is stirred at room temperature for 2 hours. The reaction mixture is concentrated under reduced pressure and tthe residue is mixed with 10% aqueous sodium hydroxide (30 ml.). The resultant mixture is shaken with ether. The ethereal layer is dried over potassium carbonate and the ether is evaporated to give crude product (1.98 g.). The crude product is distilled at 118 to 124° C./2 mm. Hg to give 2-bromo-7-anti-aminobenzo[5,6]-5-norbornene (1.78 g.).

I.R. cm.$^{-1}$: $\nu_{NH}$ 3400.

(b) To a solution of 2-bromo-7-anti-aminobenzo[5,6]-5-norbornene (1.78 g.) in ethanol (50 ml.), there are added palladium-carbon prepared by a mixture from a mixture of 1% palladium chloride (10 ml.) and active carbon (100 ml.) as a catalyst and sodium acetate (670 mg.), and the resultant mixture is subjected to catalytic reduction. Hydrogen gas (120 ml.) is taken up and the catalyst is filtered off. The solvent is evaporated from the filtrate and the residue is distilled at 87 to 92° C./1 mm. Hg to give 7-anti-aminobenzo[5,6]-5-norbornene (1.0 g.). This substance readily forms a carbonate in the aerial atmosphere; the hydrochloride melts above 240° C.

I.R. cm.$^{-1}$: $\nu_{NH}$ 3360.

EXAMPLE 3

(a) Into a solution of 2,3-exo-carboethoxyiminonorbornane (57.19 g.) in pentane (570 ml.), there is stirred hydrogen bromide which is prepared by adding bromine (79.3 g.) to Tetralin dropwise. Introduction of hydrogen bromide is continued for 5 hours and stirring is effected for half an hour. The solvent is evaporated under reduced pressure and the residue is dissolved in ether. The ethereal layer is washed with 10% aqueous sodium carbonate and dried over sodium sulfate. After evaporation of the ether, there is obtained a gelatinous substance (68.10 g.). This substance is chromatographed on alumina with a mixture of benzene and hexane (1:1) and the eluate is distilled at 140 to 155° C./2 mm. Hg to give 2-bromo-7-syn-carboethoxyaminonorbornane.

I.R. cm. $^{-1}$: $\nu_{NH}$ 3420, 3340.

(b) To a solution of sodium (21.6 g.) in methanol (310 ml.), there is added 2-bromo-7-syn-carboethoxy-aminonorbornane (24.6 g.), and the resultant mixture is refluxed for 4.5 hours. After evaporation of the solvent, the residue is dissolved in ether. The ethereal solution is washed with water, dried over sodium sulfate and the ether is evaporated. The residue is distilled at 90 to 103° C./5 mm. Hg to give 7-syn-carbomethoxy-5-norbornene (9.7 g.).

I.R. cm.$^{-1}$: $\nu_{NH}$ 3430.

(c) To a solution of sodium hydroxide (28.6 g.) in water (43 ml.), there is added a solution of 7-syn-carbomethoxyamino-2-norborne (8.52 g.) in methanol (86 ml.), and the resultant mixture is refluxed under heating for 17 hours. After completing the reaction, the solvent is distilled. The distillate is mixed with acetic acid (1 ml.) to give an acetate of the base. The acetate is dissolved in water, and the aqueous solution is made alkaline and shaken with ether. On the other hand, the residue after evaporation of the solvent is dissolved in ethanol. The ethanol solution is washed with a saturated saline solution and combined with the said ethereal solution. The resultant mixture is dried over potassium carbonate and the solvent is evaporated. The residue is distilled at 68 to 71° C./140 mm. Hg to give 7-syn-amino-5-norbornene (3.41 g.).

I.R. cm.$^{-1}$: $\nu_{NH}$ 3390, 3451.

This substance is treated with acetic anhydride to give 7-syn-acetylamino-5-norbornene as needles melting at 92.5° C.

I.R. cm.$^{-1}$: $\nu_{CO}$ 1681.

EXAMPLE 4

(a) Into a solution of 2,3-exo-carboethoxyimino-5-norbornene (107.87 g.) in pentane (950 ml.), which is cooled to an internal temperature of −50° C. with a mixture of Dry Ice and acetone, there is introduced hydrogen bromide which is prepared by adding bromine (241 g.) dropwise to Tetralin under stirring for about 6 hours. Stirring is continued further for half an hour, and a solution of isopropylamine (48 g.) in ether (240 ml.) is added in half an hour to the reaction mixture. Then, the bath of acetone and Dry Ice is taken off and a saturated aqueous solution of potassium carbonate (190 ml.) is added to the reaction mixture. The reaction mixture is shaken with ether at room temperature. The ethereal layer is washed with a saturated saline solution, dried over sodium sulfate and the ether is evaporated to give crude product (146.6 g.). The crude product is purified by distillation, alumina chromatography and distillation in order to give 2-bromo-7-anti-carboethoxyamino-5-norbornene.

NMR $t$: $H_7$ 6.07 ($d$); $H_2$ 6.23 ($q$).

(b) To a mixture of metal lithium (31.4 g.) with liquid ammonia (2.15 liters) at −50° C., there is added dropwise a solution of 2-bromo-7-anti-carboethoxyamino-5-norbornene (146.6 g.) in ether (100 ml.) under stirring in half an hour, and the resultant mixture is stirred for 2 hours. The reaction mixture is mixed with ethanol (69.3 g.) and ammonium chloride (161 g.) to give white turbidity. The ammonia is evaporated and the residue is mixed with water. the resultant mixture is shaken with ether. The ethereal layer is washed with a saturated saline solution, dried over potassium carbonate and the ether is evaporated. The residue is distilled at 70 to 125° C./3 mm. Hg and the distillate (62.5 g.) is dissolved in pentane (100 ml.). The pentane solution is shaken with 2 N-aqueous silver nitrate (30 ml.) three times. The aqueous layer is washed with pentane and made alkaline with ammonia. The resultant oil is extracted with ether. The ethereal layer is washed with water, dried over sodium sulfate and the solvent is evaporated. The residue is distilled at 91 to 102° C./2 mm. Hg to give 7-anti-carboethoxyamino-5-norbornene (18.53 g.).

I.R. cm.$^{-1}$: $\nu_{NH}$ 3430.

(c) A mixture of 7-anti-carboethoxyamino-5-norbornene (18.53 g.), sodium hydroxide (20.4 g.), water (30 ml.) and ethyleneglycol (85 ml.) is refluxed under heating for 3.5 hours. The dark brown reaction mixture is shaken with pentane. The pentane layer is washed with a saturated saline solution, dried over potassium carbonate and the solvent is evaporated. The residue is distilled at 78 to 87° C./70 mm. Hg under nitrogen stream to give 7-anti-amino-5-norbornene (5.47 g.).

I.R. cm.$^{-1}$: $\nu_{NH}$ 3406.

This substance is treated with acetic anhydride to give 7-anti-acetylamino-5-norbornene (3.5 g.) as needles melting at 123.5° C.

Having thus disclosed the invention what is claimed is:
1. A member selected from the group consisting of compounds of the formulae

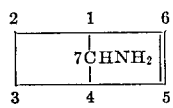

and

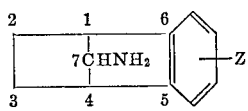

wherein Z is at least one member selected from the group consisting of H, lower alkyl, lower alkoxy, amino, (lower) alklyamino and di(lower) alkylamino.

2. A compound according to claim 1, the said compound being 7-anti-aminobenzo[5,6]-5-norbornene.
3. A compound according to claim 1, the said compound being 7-syn-amino-5-norbornene.
4. A compound according to claim 1, the said compound being 7-anti-amino-5-norbornene.
5. A member selected from the group consisting of compounds of the formulae

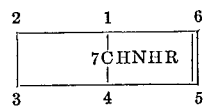

and

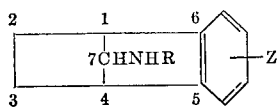

wherein Z is at least one member selected from the group consisting of H, lower alkyl, lower alkoxy, amino, (lower)alkylamino and di(lower)alkylamino, and R is a member selected from the group consisting of (lower)-alkoxycarbonyl, aryloxycarbonyl and (lower)aralkyloxycarbonyl.

6. A compound according to claim 5, the said compound being 7 - anti - carboethoxyaminobenzo[5,6]-5-norbornene.
7. A compound according to claim 5, the said compounds being 7-syn-carboethoxyamino-5-norbornene.
8. A compound according to claim 5, the said compound being 7-anti-carboethoxyamino-5-norbornene.
9. A member selected from the group consisting of compounds of the formulae

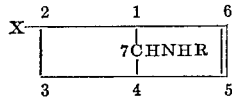

and

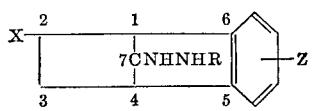

wherein Z is at least one member selected from the group consisting of H, lower alkyl, lower alkoxy, amino, (lower)alkylamino and di(lower)alkylamino, and R is a member selected from the group consisting of H, (lower)-alkoxycarbonyl, aryloxycarbonyl and (lower)aralkyloxycarbonyl, and X is a member selected from the group consisting of Cl, Br and I.

10. A compound according to claim 9, the said compound being 2 - bromo - 7-anti-carboethoxyaminobenzo[5,6]-5-norbornene.
11. A compound according to claim 9, the said compound being 2 - bromo - 7-anti-aminobenzo[5,6]-5-norbornene.
12. A compound according to claim 9, the said compound being 2 - bromo-7-syn-carboethoxyamino-5-norbornene.
13. A compound according to claim 9, the said compound being 2 - bromo - 7-anti-carboethoxyamino-5-norbornene.
14. The compound 7-syn-acetylamino-5-norbornene.
15. The compound 7-anti-acetylamino-5-norbornene.

References Cited

Zalkow et al.: J. Org. Chem., 28, 3303–9 (1963).

LORRAINE A. WEINBERGER, *Primary Examiner.*

PAUL J. KILLOS, *Assistant Examiner.*

U.S. Cl. X.R.

260—239, 308, 471, 563, 561, 570.5, 999